United States Patent [19]

Van den Bosch

[11] 3,913,128

[45] Oct. 14, 1975

[54] HIGH RESOLUTION COLOR TV MICROSCOPE APPARATUS

[76] Inventor: Francois J. G. Van den Bosch, 11 Hillcrest Road, Cedar Grove, N.J. 07009

[22] Filed: July 13, 1973

[21] Appl. No.: 379,099

[52] U.S. Cl. .................................................. 358/42
[51] Int. Cl.$^2$ ........................................ H04N 9/07
[58] Field of Search ....... 178/5.4 R, 5.4 CF, DIG. 1; 358/42, 53, 43, 41

[56] References Cited

UNITED STATES PATENTS

| | | | |
|---|---|---|---|
| 3,229,089 | 1/1966 | Sasao | 178/5.4 CF |
| 3,628,014 | 12/1971 | Grubic, Jr. | 250/49.5 A |
| 3,639,684 | 2/1972 | Levine | 358/42 |
| 3,781,464 | 12/1973 | Boysky | 178/5.4 R |

*Primary Examiner*—Benedict V. Safourek
*Assistant Examiner*—Mitchell Saffian
*Attorney, Agent, or Firm*—Watson, Cole, Grindle & Watson

[57] ABSTRACT

A simplified color TV system having specified frame and field rates generates a number of successively repetitive discrete bandwidth spectra within a number of respective different color spectra to irradiate a subject. The irradiation is either transmitted through or reflected from said subject to a single electron gun vidicon tube for transducing the optical images of the irradiated subject into electrical signals. The electrical output of the vidicon tube may be fed to a conventional three-electron gun color TV tube for monitoring the images. The three electron guns of the monitor are controlled in accordance with the electron image output of the vidicon tube, representing the discrete bandwidth spectra, to provide an integrated color image of the subject on the monitor.

The simplified TV system obviates the necessity of a conventional three-beam vidicon to detect the color images reflected or transmitted through the subject. This is accomplished by strobing the subject with successive repetitive narrow bandwidth spectra generated by prisms, transmission diffraction gratings, diffraction gratings, interference filters or pulsed laser sources. The generation of the discrete bandwidth spectra is synchronized with the field rate of the color TV system.

14 Claims, 5 Drawing Figures

HIGH RESOLUTION COLOR TV MICROSCOPE APPARATUS

Figure 1:
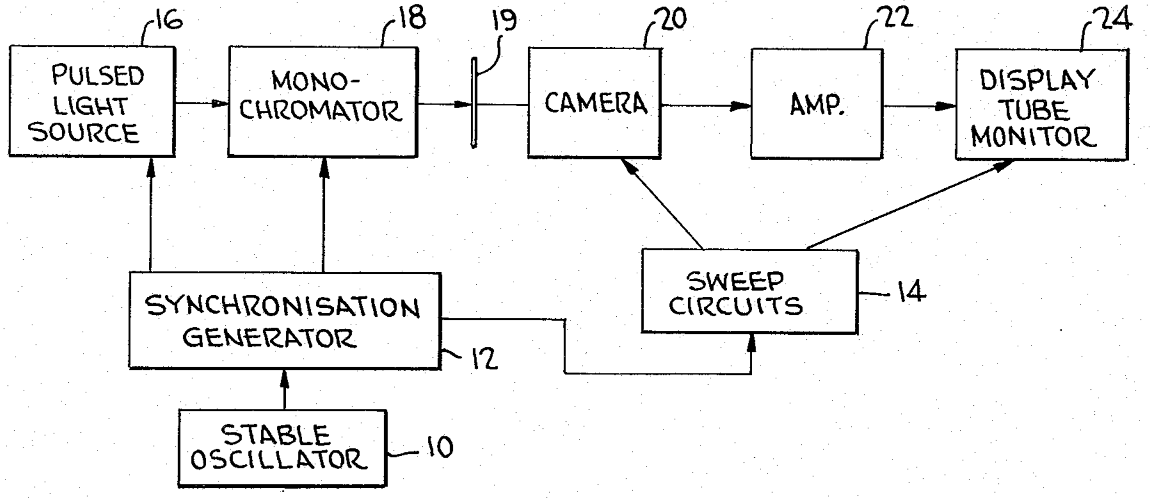

This invention relates to apparatus for the visual display and observation of biological specimens and, in particular, to such display and observation using simplified color TV techniques in a TV microscope type apparatus.

It is well known that the reproduction of color pictures by TV presents different problems than those which are encountered with color photographic techniques. Additionally, the electronic scanning of an object for the purposes of color TV presentation involves generally complex electronic circuitry as compared with, for exaample, that which is required for monochromatic television. Although such complexities are somewhat reduced when the color TV images are used in a closed circuit TV system which does not require transmission and reception by TV antennas, commercially acceptable color TV techniques are unnecessarily complex for the visual examination and display of biological specimens.

The present invention provides a high resolution, high definition, full color optical microscope using simplified color television techniques. In the present invention, the biological specimen, or any scene, object or picture which will reflect or transmit light, is illuminated with a rapidly changing sequence of selected different monochromatic light spectra of narrow bandwidth. For example, several narrow bandwidths in each of the colors red, green, blue and yellow are generated and projected onto the specimen or subject. The illumination of the specimen, for example with a narrow spectra in the red color band, will cause all the color covered by that band to become neutralized, thereby subtracting the information pertaining to that particular band from the color of the specimen. Similar narrow band color subtraction occurs for the colors green, blue and yellow.

In well-known commercial TV color systems, three cameras are used simultaneously for respectively producing the colors red, green and blue. The respective color spectrums of each of the individual cameras slightly overlap so that in the red spectrum there is intermixed therewith a portion of the green spectrum, similarly the green spectrum includes a portion of the red and blue spectrums, and finally the blue spectrum includes a portion of the green spectrum.

The TV color microscope of the present invention avoids the necessity of having three individual cameras or vidicons by using the repetitive sequential projection of the individual narrow band spectra from each of four colors. The successive spectra, which are projected onto the specimen and either reflected or transmitted therethrough, are displayed by a suitable monitor. The human eye integrates the displayed spectra, thereby providing the desired reconstruction of the specimen image.

The new spectro-analytical instrument of this invention enables in vivo analytical procedures and by narrowing the band spectra within each of the respective four colors, for example to one Angstrom, even absorption line spectra can be obtained in vivo while a patient is on the operating table. Thus, a complete analysis of a biological specimen can be obtained almost instantaneously and observed by a physician or surgeon while the operation is actually being undertaken. This represents a great advancement in such analytical procedures, which formerly required that the biological specimen be carried to a lab, separate from the operation room, for microscopic examination.

In all known color TV microscope systems, the specimen or scene is viewed through suitable filters. In the present invention that process is reversed by illuminating the specimen or scene with pure successive bands of monochromatic light. The bands of monochromatic light are generated by prisms, transmission diffraction gratings, diffraction gratings, interference filters, or pulsed monochromatic sources, such as a laser source. All of these monochromatic light generators are well known to those skilled in the art.

The system also differs fundamentally from existing systems in that high resolution is achieved by narrowing the bandwidth of a monochromatic light source and/or by the application of pulse techniques for pulsing the monochromatic light source in synchronization with the field frequency of the TV system. As is generally known, the formula for determining the limit of optical resolution is defined from the following relationship:

$$l = \frac{0.61\,\lambda}{n \sin u} \text{ where}$$

$l$ is defined as the smallest distance between two points of the object that are just resolved, $\lambda$ is defined as the bandwidth of the irradiating source, $n$ is defined as the refractive index of the material in the object space, $u$ is defined as the angle that the extreme ray entering the objective makes with the axis of the instrument.

From the above formula it is evident that the bandwidth of the irradiating source is significant in obtaining optimum resolution. Consequently, for example, the use of an adjustable monochromator in conjunction with a wide-band light source enables the bandwidth of the light irradiation to be adjusted as required.

A further feature of the present invention is that the monochromatic light source is extinguished during the system synchronization pulses to eliminate the generation of unwanted electronic noise to obtain higher quality picture results. The fact that the subject or specimen is illuminated with pure narrow bands of color, whereby the narrow bands of color are subtracted from the colors of the subject, also tends to increase the image resolution of the system.

Classically, known color TV systems use three fundamental colors and two factors to obtain good picture reproduction. One factor, luminance, compensates for visual sensitivity with respect to differences in brightness, and the second factor, chromanance, defines color resolution. For example, a color TV receiver receives the luminance signal consisting of the three main colors, red, plus green plus blue, and two chromanance signals that modulate the sub-carrier frequency. A red signal is obtained by adding the chromanance and luminance signals in the receiver as, for example, red plus green plus blue plus (red minus (red plus green plus blue)) equals red. A blue signal is obtained by adding red plus green plus blue plus (blue minus (red plus green plus blue)) equals blue. A green signal is obtained by subtracting the sum of the two chromanance signals (red plus blue) from the luminance signal (red plus green plus blue) minus (red plus blue) equals green.

The present invention makes use of a multi-color sequential system comprising the colors red plus green plus yellow plus blue. The well-known interlaced TV scanning system comprising 30 frames and 60 fields may be used in which one field is scanned in a narrow band, for example red, while the other field or other half frame is then scanned in green. The scanning of yellow and blue is then accomplished in the respective fields of the next frame. However, the present invention also contemplates an increase of the number of fields to 90 per second with a corresponding increase in the number of frames to 45 so as to further enhance the blending of the four colors.

The utilization of the sequential scanning for the fields and the frames enables the use of a single vidicon camera with, for example, a monochromator and a pulsed light source to obtain perfect color blending with sufficient signal strength to provide sufficient luminance and chromanance without the necessity of complicated or complex delay line systems or the use of a multiplicity of vidicon cameras at the pick-up end.

It is a primary object of the present invention to provide a high resolution color TV microscope having less complex electronic circuitry than normal color TV systems.

It is a further object of the present invention to provide a color TV microscope display system using pulse synchronization techniques to synchronize the operation of the light source when irradiating the specimen and synchronizing the visual display tube monitor and/or a vidicon camera which is used for recording specimen images.

The above, as well as other, objects and features will become apparent with reference to the accompanying drawings when taken in conjunction with the following description.

Figure 2A:
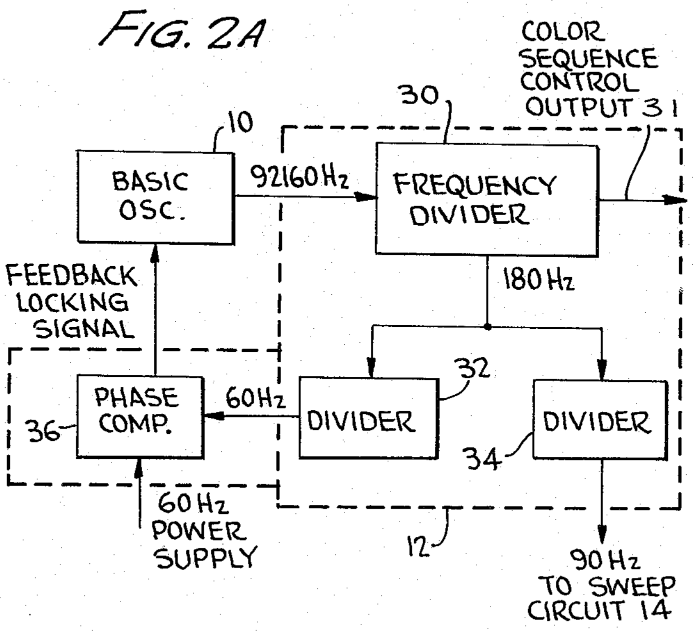
Figure 2B:
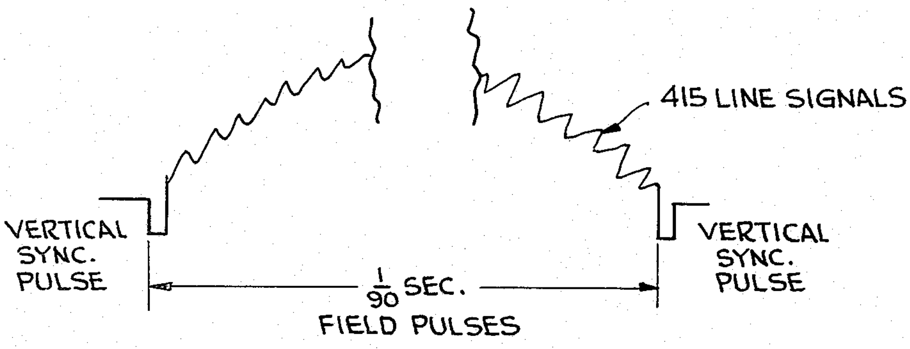
Figures 3A, 3B:
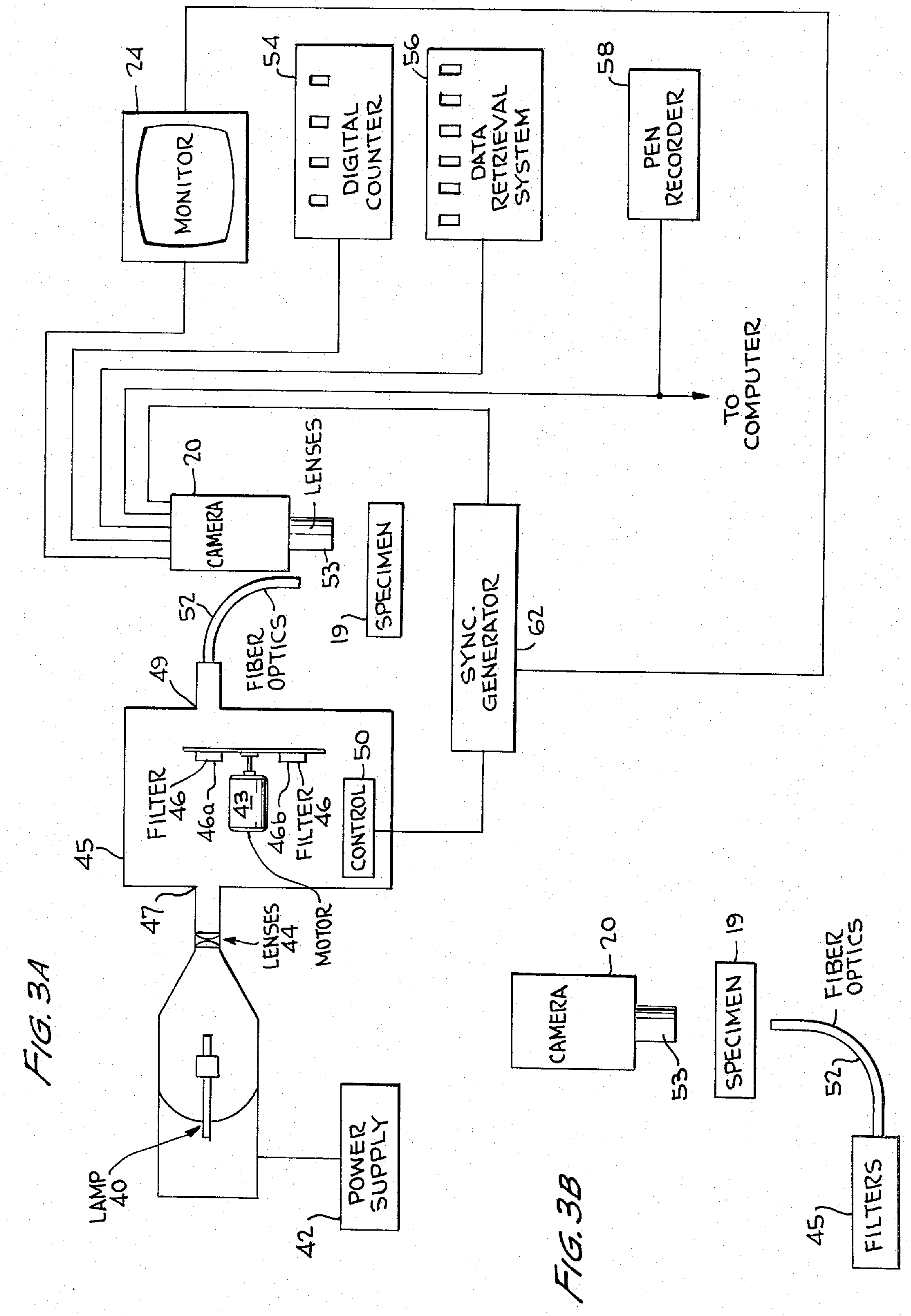

FIG. 1 illustrates in block diagrammatic form the first embodiment of the present invention;

FIG. 2*a* is a block diagram representation of the basic oscillator and synchronization generator of FIG. 1;

FIG. 2*b* is a simplified representation showing the relationship of the vertical sync pulses for one field produced the the color TV microscope system;

FIG. 3*a* is a combined pictorial and block diagrammatic representation of a modified embodiment of the present invention; and FIG. 3*b* illustrates a modification of the apparatus for illuminating the specimen in the embodiment of FIG. 3*a*.

Stable oscillator 10 provides the necessary basic temperature stabilized frequency signals for controlling the operation of the system. The 92160 Hz stable frequency output of oscillator 10 is received by synchronization generator 12, which provides the basic stable frequencies to produce line and frame frequency signals for sweep circuit 14 as well as synchronizing pulses for vidicon camera 20 and monitor display 24. Synchronization generator 12 provides coincidence between the aforementioned synchronization pulses and pulses controlling pulsed light source 16 whereby the initiation of a picture frame corresponds to the generation of a light pulse. Similarly, the synchronization pulses control monochromator 18 so that one field of the TV system corresponds to one narrow light band emission from the monochromator. The generation of the synchronization pulses will be described more fully below with reference to FIG. 2A.

Light source 16 may comprise a zenon high-intensity lamp which radiates its total energy spectrum into monochromator 18 which, as is well known, consists of a number of gratings, each having a definite wavelength transmission characteristic and bandwidth. The output of monochromator 18 is directed to specimen 19 and the resulting light image, which may either be reflected from specimen 19 or transmitted through it, is directed to the face of vidicon camera 20. Vidicon camera 20 converts the light images into corresponding electrical signals. Such vidicon cameras are well known to those skilled in television techniques and therefore no detailed explanation of the operation of such apparatus is necessary for the purposes of this invention. Amplifier 22 amplified the electrical signal output of vidicon camera 20 for the purpose of displaying the light images on display monitor 24.

The bandwidth required for a high performance video system is generally known to those skilled in the art. It is generally recognized that the bandwidth of the video system is also a limiting factor concerning the resolution of the light images produced by the video system. For example, in a high resolution video system in which 1,000 vertical lines are used, along with an equal number of horizontal lines, and assuming a frame rate of thirty frames per second, a 30 MHz bandwidth is required to cope with all the information provided by the sweep circuitry. In the present invention, either a thirty or a forty-five frame rate reference can be utilized with respective field rates of sixty or ninety fields/-sec. However, the number of vertical and horizontal sweeps is reduced to 415 so that the video information can be handled by a 32 MHz bandwidth of amplifier 22. Video amplifier 22 must be capable of handling all frequencies up to 32 MHz, and it is preferable that its frequency characteristics extend substantially down to the very low frequencies approaching a D.C. level. Such video amplifiers are well known in the TV industry and consequently no further elaboration concerning their structure is considered necessary for the purposes of the present invention.

The narrow bandwidth light spectra are generated as follows. For example, blue color is obtained from several bandwidths in the blue region of the spectrum, for example, as from two successive blue color regions initiating illumination at 4225 Angstroms and extinguishing such illumination at 4375 Angstroms. That illumination is followed by a dark period of approximately 50 Angstroms and then the subsequent illumination from another region of the blue spectrum, for example, at 4425 Angstroms, is begun and then extinguished at 4575 Angstroms, thereby obtaining another spectral band of 150 Angstroms. The aforesaid illumination is repeated in a pulsating manner for any desired number of illuminations from the blue spectrum. Similar, repetitive, pulsating illuminations are obtained from the other colors, red, green and yellow. The duration of illumination of each color is so timed with the synchronization generator to last only for the time duration of one field in the analyzing raster of the camera and the corresponding raster at the monitor. The vertical sync pulses and the signals for one field are illustrated in FIG. 2B. The width of the vertical sync pulse is approximately one-tenth of the field width or one nine-hundredth of a second.

Tables I and II respectively illustrate two different sequences for generating the colored light emissions for the present invention.

TABLE I

Monochromatic Color System Sequence "A"
Color Sequence
R =Red G =Green Y =Yellow B =Blue
Wavelengths in Angstroms Bandwiths all 150 Angstroms

| | Start | Peak | Extinction |
|---|---|---|---|
| B | 4225 | 4300 | 4375 |
| B | 4425 | 4500 | 4575 |
| B | 4625 | 4700 | 4775 |
| B | 4825 | 4900 | 4975 |
| G | 5000 | 5075 | 5150 |
| G | 5175 | 5250 | 5325 |
| G | 5350 | 5425 | 5500 |
| G | 5525 | 5600 | 5675 |
| Y | 5700 | 5775 | 5850 |
| Y | 5875 | 5950 | 6025 |
| Y | 6050 | 6125 | 6200 |
| R | 6250 | 6325 | 6400 |
| R | 6450 | 6525 | 6600 |
| R | 6650 | 6725 | 6800 |
| R | 6850 | 6925 | 7000 |

TABLE II

Monochromatic Color system Sequence "B"
Color sequences
R =Red G =Green Y =Yellow B =Blue
Wavelength (Angstroms)

| Color | Start | Peak | Extinction | Bandwidth |
|---|---|---|---|---|
| G | 5175 | 5250 | 5325 | 150 |
| Y | 6050 | 6125 | 6400 | 150 |
| B | 4425 | 4500 | 4575 | 150 |
| G | 5000 | 5075 | 5150 | 150 |
| Y | 5700 | 5775 | 5850 | 150 |
| R | 6250 | 6325 | 6400 | 150 |
| G | 5350 | 5425 | 5500 | 150 |
| B | 4225 | 4300 | 4375 | 150 |
| R | 6450 | 6525 | 6600 | 150 |
| B | 4625 | 4700 | 4775 | 150 |
| G | 5525 | 5600 | 5675 | 150 |
| R | 6650 | 6125 | 6800 | 150 |
| R | 6850 | 6925 | 7000 | 150 |
| Y | 5875 | 5950 | 6025 | 150 |
| B | 4825 | 4900 | 4975 | 150 |

From the above, it is evident that the whole visible color spectrum may be covered by several interrupted bandwidth illuminations, each separated by a short, dark period, thereby generating a pulsating form of illumination. The onset of each bandwidth is controlled by the pulses furnished by synchronization generator 12 and oscillator 10 as illustrated in FIG. 2A.

With respect to FIG. 2A the 92160 Hz output of stabilized basic oscillator 10 is fed to frequency divider 30 for the generation of the necessary color sequence control outputs 31 and a 180 Hz output. Frequency divider 30 comprises a number of sequentially connected divider circuits which individually are well known to those skilled in the art. The color sequential control output 31 is provided to pulsed light source 16 and monochromator 18 to generate therefrom the necessary color sequences illustrated in either Table I or Table II.

Pulsed light source 16 may comprise a flash tube illuminator, the flashes of which correspond to the field vertical synchronization pulse generated by synchronous generator 12. Monochromator 18 may consist of a well-known diffraction grating which is started in synchronization with the same vertical field pulse.

It is apparent that the color sequence control output from frequency divider 30 can be modified to provide other color sequences than those specifically shown in Tables I and II by appropriate adjustment of frequency divider 30. Color sequence control outputs 31 contain signals for starting and extinguishing pulsed light source 16 in synchronization with the control of monochromator 18 to produce desired sequential color sequences therefrom.

It is further understood that basic oscillator and/or synchronization generator 12 may be modified to generate appropriate control signals for the other devices specified herein that can be substituted for pulsed light source 16 and/or monochromator 18, including the monochromatic illuminator of FIG. 3A.

The 180 Hz output from frequency divider 30 is fed to dividers 32, 34 to generate respective 60 Hz and 90 Hz output signals. The 90 Hz output from divider 34 is fed to sweep circuit 14 for the generation of the necessary frame and field signals to control the operation of vidicon camera 20 and display monitor 24 including their respective vertical and horizontal sweep circuits.

Monitor display system 24 comprises a color TV tube and its associated synchronizing gates and final video amplifier. The synchronizing gates and video amplifier are controlled by the signals generated in sweep circuit 14 as controlled by synchronization pulses from synchronization generator 12. Monitor 24 may be synchronized at the onset of each illuminating bandwidth by a photoelectric device which senses the illumination and generates a synchronization pulse to a control electrode within the monitor.

The 60 Hz output from divider 32 is fed to a phase comparator 36 which compares that output with the 60 Hz frequency of the power supply to provide a feedback locking signal to basic oscillator 10 for stabilizing the frequency of the basic oscillator at 92160 Hz. The operation of phase comparator 36 in generating the feedback locking signal is well known to those skilled in the art; therefore no further detailed description of either its structure or operation is considered necessary for the purposes of this invention. Similarly, the circuitry comprising frequency divider 30 and dividers 32, 34 is also well known to those skilled in the art so that no further elaboration of their respective structures is necessary to practice the invention.

The monochromatic light source illuminates the scene or specimen 19 on the monitor screen thereby obviating the need of filtering systems in front of the photoconductive surface of the vidicon camera tube, or image orthicon tube or the like, as is generally required by known television techniques. Additionally, by illuminating the specimen with monochromatic light there is a considerable gain in the resolution obtained over that obtained with simply using broad filters in front of a photoconductive sensing device. It is apparent that the resolution will be increased in proportion to the decrease of the bandwidth of the various illuminating colors. For example, the use of four different illuminating bandwidths in each of the four colors provides a remarkable increase in resolution with that obtained by the use of only three broader color bandwidths such as red, green and blue which are normally used in color TV systems.

FIG. 3A illustrates a preferred embodiment of the color TV microscope system of the present invention. Lamp 40 is a 500 Watt zenon lamp which is continuously energized from power supply 42. Collimating lenses 44 project the wide band light spectra from lamp 40 to monochromatic illuminator 45 and more specifically to rotating filter disc 46. Disc 46 has mounted thereon a number of filters each individually representing the desired narrow bandwidth within each of the four colors used in the present system. Only two of such filters 46*a* and 46*b* are illustrated in FIG. 3A. The filters are mounted on filter disc 46 in the desired colored sequence, such as the color sequence illustrated in either Table I or II above. There are fifteen equally spaced filters, each respectively corresponding to a given light spectra having the bandwidth indicated, for example, in Tables I and II above. Filters 46*a*, 46*b*, etc. may comprise ordinary color filters or interference filters known to those skilled in the art. Disc 46 also includes an aperture for generating a repetitive, periodic signal which will be more fully described hereinafter.

Sync generator 62 is similar to sync generator 12 previously described; however, its synchronous output signals are fed to control 50 within monochromatic illuminator 45 for the purpose of controlling the movement of motor 48. Motor 48 may rotate continuously in synchronous relationship to the frame and field rate of the TV system, or in stepped, synchronous rotation thereto. For continuous rotation it is apparent that the speed of motor 48 must be regulated so that each respective filter 46*a*, 46*b* on disc 46 rotates between the collimated light at aperture 47 within the duration of a single field of the TV system. It is further apparent that the spacing between the filters must be established to account for the vertical sync pulses between the fields of each frame of the TV signal. Thus, if the vertical sync pulse has a width one-tenth that of the field duration, then the blank spacing between each filter on disc 46 will occupy one-tenth of the spacing between respective filters.

For continuous rotation of motor 48, control 50 will include the necessary pulse shaping circuitry to generate a suitable energization of the motor using that signal itself, or in the alternative, control 50 can modify the synchronization signal from sync generator 62 to generate other synchronization signals to regulate separate A.C. power source.

Motor 48 may comprise a stepping motor, in which case control 50 will generate signals for synchronously stepping the motor so that a given filter on disc 46 rotates between apertures 47 and 49 during a given field of the TV system.

The sequential narrow band light spectra are emitted from aperture 49 in monochromatic illuminator 45 and projected by means of fiber optic bundle 52 onto the surface of specimen 19 at an angle whereby the reflected light from the specimen will be projected to lenses 53. Lenses 53 provide magnification of the light image which is then projected onto the photoconductive face of vidicon camera 20 as previously described. Using the elements as described above, and a 500 Watt zenon lamp, the output at port 49 is approximately fourteen Watts.

Lamp 40, collimating lenses 44, monochromatic illuminator 45, fiber optic bunder 52, as well as camera lenses 53, are mounted on a stereo microscope or an operating microscope well known to those skilled in the art of spectro analysis.

Continuing with FIG. 3A, the electrical signals on video camera 20, which are representative of the light images projected on its photoconductive face, may be fed to monitor 24 for the instantaneous display of the specimen. Additionally, the video camera output can be fed to pen recorder 58 or to a computer for permanent or temporary storage therein.

As mentioned previously, monitor 24 consists of a standard, commercial color TV tube which has three electron guns respectively corresponding to the red, green and blue colors normally used in conventional color TV systems. The previously described sync signal from the aperture in filter disc 46 is used to trigger one of the three electron guns in monitor 24 and thereafter these electron guns will successively generate the necessary beams to produce the color image on the face of the monitor. For example, if the trigger signal is used to initially trigger the red electron gun, and if the color filters on filter disc 46 are successively arranged on the disc in the order shown in Table I (with the blue spectra starting at 4225 Angstroms immediately following the aperture in the direction of rotation of the filter disc, and so that the last spectra, namely, the red spectra having its initial bandwidth starting at 6850 Angstroms is adjacent the aperture on the opposite side thereof from the first blue spectra) then the color sequence of Table I will produce overlapping of colors just as in a known color TV system. The red electron gun will be triggered at the first blue spectra, the green electron gun with the second blue spectra, the blue electron gun will be triggered with the third blue spectra, the red electron gun will be triggered with the fourth blue spectra, the green electron gun will be triggered by the first green spectra, the blue electron gun will be triggered by the second green spectra, etc. It is therefore readily apparent that there will be an overlapping of the red, green and blue colors on the face of monitor tube 24.

The color sequence may be rearranged, for example as illustrated in Table II above, so that any one of the red, blue or green electron beams may be excited by another color spectra to provide different results, that is, the enhancement of certain colors, the elimination of certain colors, a different blending of the colors, etc.

Digital counter 54 is responsive to the previously mentioned aperture on disc 46 whereby an indication can be provided as to the number of scans or color sequences that are produced, for example in any given time period, as an aid in the spectro analysis of the specimen.

Further, the outputs from video camera 20 may be used in data retrieval system 54 wherein the light images may be stored and then retrieved from storage as desired by the spectro analyst.

FIG. 3B shows a modification of the apparatus of FIG. 3A whereby the light from fiber optic bundle 52 is transmitted through specimen 19 to camera lenses 53 as to being reflected from the specimen in the apparatus of FIG. 3A.

Because the present invention is not concerned with the compatibility of color TV with black and white reception, the luminance signals normally utilized by classical TV color systems to enable such compatibility are of no consequence, thereby resulting in a simplification of the color TV system. Further, the lack of luminance signals enables the system to be a pure color sequential system using an increased field rate of ninety fields per second instead of the normal 60 fields per second as well as an increased frame rate of 45 frames per second instead of the normal 30 frames per second. The combination of all these factors enhances the resolution since it enables an increased scanning rate to be used.

The color TV system of this invention has been developed to be used as a viewing microscope for enhancing the specimen color resolution by increasing the frame and field rate and by utilizing narrow bands of illumination in each of the color bands which are sequentially generated from a pulsating light or illuminating source. The monochromatic illumination of the specimen obviates the shortcomings of classical filter systems used in color TV systems. The color sharpness and electronic noise in the system have been reduced by deliberately providing dark intervals between each band in each sequentially generated color.

What is claimed is:

1. A TV system having a specified frame and field rate for the microscopic display of a subject, comprising:

source means for generating a number of successively repetitive discrete bandwidth spectra within a number of respective different spectra to irradiate said subject;

transducer means responsive to the successive irradiation of said subject for generating electrical signals representative thereof;

means for displaying the successive discrete bandwidth spectra radiated from said subject;

synchronization means for generating signals for synchronizing said source means, said transducer means and said means for displaying with said frame and field rate; and said source means includes a light source radiating white light and a monochromator responsive to said white light for generating said discrete bandwidth spectra; and said signals generated by said synchronization means synchronize said monochromator with said frame and field rate.

2. The TV system as in claim 1 wherein said means for displaying is a color CRT and further comprising means for altering the synchronization between said source means and said CRT to initiate display thereon of desired different ones of said discrete bandwidth spectra.

3. The TV system as in claim 1 wherein said means for displaying is a color CRT wherein each field of the vertical sweep thereof includes 415 lines, said synchronization means generates vertical synchronization pulses for said CRT having an interval one-tenth the interval of said field.

4. A TV system having a specified frame and field rate for the microscopic display of a subject, comprising:

source means for generating a number of successively repetitive discrete bandwidth spectra within a number of respective different spectra to irradiate said subject;

transducer means responsive to the successive irradiation of said subject for generating electrical signals representative thereof;

means for displaying the successive discrete bandwidth spectra radiated from said subject;

synchronization means for generating signals for synchronizing said source means, said transducer means and said means for displaying with said frame and field rate; and wherein the field and frame rate are in the respective ranges of 60 to 90 fields/sec. and 30 to 45 frames/-sec. whereby the resolution of the successive discrete bandwidth spectra radiated from said subject are enhanced on said means for displaying.

5. The system of claim 4 wherein said source means further includes a rotating disc, discrete bandwidth color filters mounted in spaced relation on said disc, and means for rotating said disc whereby said filters are exposed to said white light source in successive synchronization with said frame and field rate so that each of said discrete bandwidth spectra is generated within a respective field of said TV system.

6. A system as in claim 5 further comprising means for projecting said discrete bandwidth spectra onto said specimen to be reflected therefrom to said means for generating electrical signals.

7. A system as in claim 5 further comprising means for projecting said discrete bandwidth spectra through said specimen to said means for generating electrical signals.

8. The TV system as in claim 5 wherein said means for rotating is a step-motor.

9. The TV system as in claim 5 wherein said means for rotating is a continuous motor.

10. The TV system as in claim 5 wherein said source means generates said number of successively repetitive discrete bandwidth spectra within a number of respective different spectra in accordance with the color sequence of Table I.

11. The TV system as in claim 5 wherein said source means generates said number of successively repetitive discrete bandwidth spectra within a number of respective different spectra in accordance with the color sequence of Table II.

12. A system as in claim 4 wherein the field and frame rates are respectively 90 fields/sec. and 45 frames/sec.

13. The TV system as in claim 4 wherein said successively repetitive discrete bandwidth spectra are separated by blanking intervals during which no discrete bandwidth spectra are generated.

14. The TV system as in claim 13 wherein said means for displaying is a color CRT and further comprising means for altering the synchronization between said source means and said CRT to initiate display thereon of desired different ones of said discrete bandwidth spectra and wherein each field of the vertical sweep of said color CRT includes 415 lines, and said synchronization means generates vertical synchronization pulses for said CRT having an interval one-tenth the interval of said field.

* * * * *